United States Patent
Komoda et al.

(10) Patent No.: US 6,720,717 B2
(45) Date of Patent: Apr. 13, 2004

(54) FIELD EMISSION-TYPE ELECTRON SOURCE

(75) Inventors: Takuya Komoda, Sanda (JP);
Yoshiyuki Takegawa, Nara (JP);
Koichi Aizawa, Neyagawa (JP);
Takashi Hatai, Neyagawa (JP);
Tsutomu Ichihara, Hirakata (JP);
Yoshiaki Honda, Kyoto (JP);
Yoshifumi Watabe, Tondabayashi (JP);
Toru Baba, Shijonawate (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/252,800

(22) Filed: Sep. 24, 2002

(65) Prior Publication Data
US 2003/0076023 A1 Apr. 24, 2003

(30) Foreign Application Priority Data

Sep. 25, 2001 (JP) .................. 2001-290335
Mar. 25, 2002 (JP) .................. 2002-083927
Mar. 25, 2002 (JP) .................. 2002-083928

(51) Int. Cl.$^7$ .................. H01L 1/05
(52) U.S. Cl. .................. 313/310; 313/495
(58) Field of Search .................. 213/309, 310, 213/336, 351, 495

(56) References Cited
U.S. PATENT DOCUMENTS 6,249,080 B1  6/2001  Komoda et al.
6,285,118 B1  9/2001  Hatai et al.
6,498,426 B1  12/2002  Watabe et al.
6,583,578 B1  6/2003  Ichihara et al.
6,590,321 B1  7/2003  Komoda et al.

FOREIGN PATENT DOCUMENTS

EP   1096532     5/2001
JP   11-329213   11/1999
JP   2001-126610  5/2001

*Primary Examiner*—Vip Patel
(74) *Attorney, Agent, or Firm*—Greenblum & Bernstein, P.L.C.

(57) ABSTRACT

A lower electrode (2) and surface electrode (7) composed of a layer-structured conductive carbide layer is formed on one principal surface side of the substrate (1) composed of an insulative substrate such as a glass or ceramic substrate. A non-doped polycrystalline silicon layer (3) is formed on the lower electrode (2). An electron transit layer (6) composed of an oxidized porous polycrystalline silicon is formed on the polycrystalline silicon layer (3). The electron transit layer (6) is composed of a composite nanocrystal layer including polycrystalline silicon and many nanocrystalline silicons residing adjacent to a grain boundary of the polycrystalline silicon. When voltage is applied between the lower electrode (2) and the surface electrode (7) such that the surface electrode (7) has a higher potential, electrons are injected from the lower electrode (2) toward the surface electrode (7), and emitted through the surface electrode (7) through the electron transit layer (6).

8 Claims, 8 Drawing Sheets

FIELD EMISSION-TYPE ELECTRON SOURCE

CROSS REFERENCE TO RELATED APPLICATIONS

This application is based on and claims the benefit of priority from Japanese Patent Application Nos. 2001-290335, 2002-083927 and 2002-083928, the contents of which are incorporated herein by reference in their entirety.

BACKGROUND OF THE INVENTION

1. Field of the Invention

The present invention relates to a field emission-type electron source for emitting electron beams by means of the field emission phenomenon.

2. Description of the Prior Art

Heretofore, there has been well known in the art a field emission-type electron source (hereinafter referred to as "electron source" for brevity), as disclosed, for example, in Japanese Patent Publication No. 2987140 and Japanese Patent Laid-Open Publication No. 2001-126610.

The electron source disclosed in Japanese Patent Publication No. 2987140 includes a lower electrode, a surface electrode (upper electrode) composed of a metal thin-film, and an electron transit layer (strong-field drift layer) provided between the lower and surface electrodes. The surface electrode is disposed opposed to the lower electrode with interposing the electron transit layer therebetween. When a certain voltage is applied between the lower and surface electrodes such that the surface electrode has a higher potential than that of the lower electrode, the resulting electric field between the electrodes induces the flow of electrons from the lower electrode to the surface electrode through the electron transit layer.

For example, an oxidized or nitrided porous polycrystalline silicon layer is used as the electron transit layer. In activating the electron source, a collector is positioned opposed to the surface electrode while exposing the surface electrode to a vacuum space. Then, a DC current is applied between the surface and lower electrodes such that the surface electrode has a higher potential than that of the lower electrode, and simultaneously another DC current is applied between the collector and surface electrodes such that the collector has a higher potential than that of the surface electrode. As a result of the above operation, electrons are injected from the lower electrode to the electron transit layer, and then emitted through the surface electrode after drifting within the electron transit layer. Alteration such as oxidation of the surface of the surface electrode causes deterioration in the efficiency of emitting electrons or the electron emitting efficiency. Thus, the surface electrode is typically made of chemically stable metal (e.g. noble metal such as gold). In this case, the thickness of the surface electrode is set at about 10 nm.

In electron sources, the terms "diode current Ips" and "emission current (emission electron current) Ie" generally mean a current flowing between the surface and lower electrodes and a current flowing between the collector and surface electrodes, respectively. Greater ratio of the emission current Ie to the diode current (Ie/Ips) provides higher electrode emitting efficiency [(Ie/Ips)×100(%)]. The above electron source can emit electrons even if the DC voltage to be applied between the surface and lower electrodes is in a low range of about 10 to 20 V. Thus, the electron source can exhibit enhanced electron emission characteristics having a low dependence on vacuum degree, and emit electrons stably without occurrence of the so-called popping phenomenon during electron emission.

The lower electrode of the electron source comprises a semiconductor substrate having a resistivity relatively close to that of a conductor, and an ohmic electrode formed on the back surface of the semiconductor substrate. Alternatively, the lower electrode comprises an insulative substrate and a metal conductive layer formed on the insulative substrate.

On the other hand, the electron source disclosed in Japanese Patent Laid-Open Publication No. 2001-126610 comprises a surface electrode partially including a carbon region made of carbon or carbon compounds. This electron source can advantageously prevent excessive diode current Ips to provide enhanced electron emitting efficiency.

The conventional electron sources as described above are used in a vacuum-sealed state. In this connection, an assembling process of such electron sources involves a relatively high-temperature thermal process including a vacuum-sealing process (which is performed at about 500° C.), which inevitably increases the electrical resistance of the surface electrode and/or the lower electrode. The increased electrical resistance makes it difficult for voltage to be adequately applied between the surface and lower electrodes and/or between the collector and surface electrodes, resulting in deteriorated electron emission characteristics (such as lowered emission current or electron emitting efficiency).

The surface electrode is composed of a metal thin-film. The thickness of the surface electrode is set at 10 nm as in the foregoing electron source. A gold thin-film commonly used as the surface electrode is involved with agglomeration at a temperature of 400° C. or more. The resulting agglomeration deteriorates the thickness uniformity and continuity of the thin film, and thereby the electrical resistance of the surface electrode is increased, resulting in deteriorated electron emission characteristics. Tungsten and aluminum are known as metal having high resistibility to such agglomeration. However, if the surface electrode is made of tungsten or aluminum, the surface of the electrode will be subject to oxidation, which leads to deteriorated electron emitting efficiency.

Similarly, the lower electrode has an increased electrical resistance. The following factors are assumed as the reason for the increased electrical resistance.

(1) Agglomeration of metal
(2) Decrease in the film thickness of the lower electrode due to thermal diffusion of atoms (metal atoms) constituting the lower electrode toward a layer (e.g. electron transit layer) deposited on the lower electrode
(3) Decrease in the film thickness of the lower electrode due to thermal diffusion of atoms constituting a layer (e.g. electron transit layer) deposited on the lower electrode toward the lower electrode
(4) Increase in resistivity of the lower electrode In addition to the aforementioned electron sources, various modified electron sources for emitting electrons by means of the field emission phenomenon have been proposed. For example, one of the proposed electron sources has a MIM (Metal-Insulator-Metal) structure including an insulating layer serving as the electron transit layer. Another electron source has a MIS (Metal-Insular-Semiconductor) including a semiconductor layer provided between the electron transit layer and the lower electrode.

In view of industrial availability of the various electron sources, it is desired to provide increased emission current and enhanced electron emitting efficiency contributing to reduction in power consumption. In all of the above electron sources, electrons are emitted through the surface electrode. Thus, the electron emitting efficiency can be increased by reducing an energy loss due to electron scattering within the surface electrode. From this point of view, it is contemplable to reduce the thickness of the surface electrode insofar as device characteristics are not adversely affected. For example, Japanese Patent Laid-Open Publication No. 2001-243901 discloses an electron source intended to provide enhanced electron emitting efficiency based on the above approach. In this electron source, a surface electrode includes a metal thin-film portion having a flat surface, and a plurality of island-shaped raised portions protruding from the surface of the metal thin-film portion, the raised portions being continuously and integrally formed with the thin-film portion. However, the respective metal raised portions of this electron sources are connected with each other by the metal thin-film portion, and thereby the film thickness of the metal thin-film portion will impose a restriction on a lower limit of the electrical resistance of the surface electrode. Thus, even if it is tried to achieve a specific electrical resistance of the surface electrode required for device characteristics, there exists such a disadvantage that the thickness of the metal thin-film portion cannot be sufficiently reduced or the electron emitting efficiency cannot be sufficiently enhanced.

SUMMARY OF THE INVENTION

In view of the problems of the conventional electron sources, it is therefore an object of the present invention to provide an electron source capable of suppressing deterioration of electron emission characteristics and achieving enhanced thermal resistance.

It is another object of the present invention to provide an electron source capable of suppressing the increase of electrical resistance in a surface electrode and achieving enhanced electron emission characteristics.

In order to achieve the above objects, according to one aspect of the present invention, there is provided an electron source (field emission-type electron source) including a lower electrode, an electron transit layer, and a surface electrode. The electron transit layer is formed on the lower electrode and composed of a composite nanocrystal layer including polycrystalline silicon and a number of nanocrystalline silicons residing adjacent to a grain boundary of the polycrystalline silicon. The surface electrode is formed on the electron transit layer. In this electron source, an electron passing through the electron transit layer is emitted through the surface electrode. At least a portion of the surface electrode and/or at least a portion of the lower electrode are made of layer-structured conductive carbide or layer-structured conductive nitride.

The conductive carbide or conductive nitride has a relatively high conductivity, a relatively low work function, a melting point higher than noble metal, and an excellent diffusion barrier performance. In addition, the conductive carbide or conductive nitride has an oxidation resistance superior to that of metal such as tungsten or aluminum. In the electron source of the present invention, at least a portion of the surface electrode and/or at least a portion of the lower electrode are made of layer-structured conductive carbide or layer-structured conductive nitride. Thus, as compared to an electron source having a surface electrode composed of a metal thin-film, the electron source of the present invention can provide enhanced thermal resistance of the surface electrode and/or the lower electrode while suppressing the deterioration of electron emission characteristics. This makes it possible to prevent electron emission characteristics from being deteriorated due to a thermal process such as a vacuum-sealing process.

According to another aspect of the present invention, there is provided an electron source comprising a lower electrode, a surface electrode, and an electron transit layer. The electron transit layer is interposed between the lower electrode and the surface electrode to allow an electron to pass therethrough. An electron passed through the electron transit layer is emitted through the surface electrode. The surface electrode is composed of a multilayer film including a conductive carbide or conductive nitride layer and a noble metal layer, the surface electrode having a surface formed with a number of concave portions allowing the multilayer film to have a locally reduced thickness.

In this electron source, an energy loss due to electron scattering will be reduced in the region of the surface electrode formed with the concave portions as compared to other region. Further, electron emission characteristics can be enhanced while suppressing the increase of electrical resistance in the surface electrode because the electrical resistance of the surface electrode is substantially determined by the film thickness of the multilayer film composed of a conductive carbide layer or conductive nitride layer and a noble metal layer.

BRIEF DESCRIPTION OF THE DRAWINGS

A more complete understanding of the invention will be apparent from the following detailed description when taken in conjunction with the accompanied drawings in which same elements have the same reference numerals, wherein.

DETAILED DESCRIPTION OF THE PREFERRED EMBODIMENT (First Embodiment)

A first embodiment of the present invention will now be described.

Figure 1:
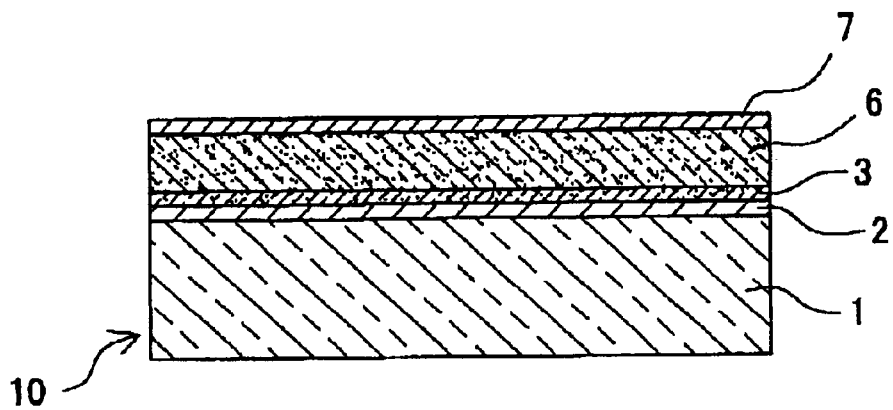
FIG. 1 is a sectional view of an electron source according to a first embodiment of the present invention.

As shown in FIG. 1, an electron source 10 according to the first embodiment of the present invention includes a substrate 1 composed of an insulative substrate (e.g. glass substrate or ceramic substrate), and a lower electrode 2 made of layer-structured conductive carbide and formed on one (diffusing surface) of the principal surfaces of the substrate 1. A semiconductor layer or a non-doped polycrystalline silicon layer 3 is formed on the lower electrode 2. An electron transit layer 6 (strong field drift layer) composed of an oxidized porous polycrystalline silicon layer is formed on the polycrystalline silicon layer 3. Further, a surface electrode 7 made of layer-structured conductive carbide is formed on the electron transit layer 6. In the electron source 10, the surface electrode 7 and the lower electrode 2 are disposed opposed to one another, and the electron transit layer 6 is interposed between the surface electrode 7 and the lower electrode 2. The thickness of the surface electrode 7 is set at 10 nm or less.

While the first embodiment employs the insulative substrate as the substrate 1, any other suitable semiconductor substrate such as a silicon substrate may be used as the substrate 1. Further, while the polycrystalline silicon layer 3 is interposed between the electron transit layer 6 and the lower electrode 2 in the first embodiment, the electron transit layer 6 may be formed directly on the lower electrode 2 without interposing the polycrystalline silicon layer 3.

Figure 2:
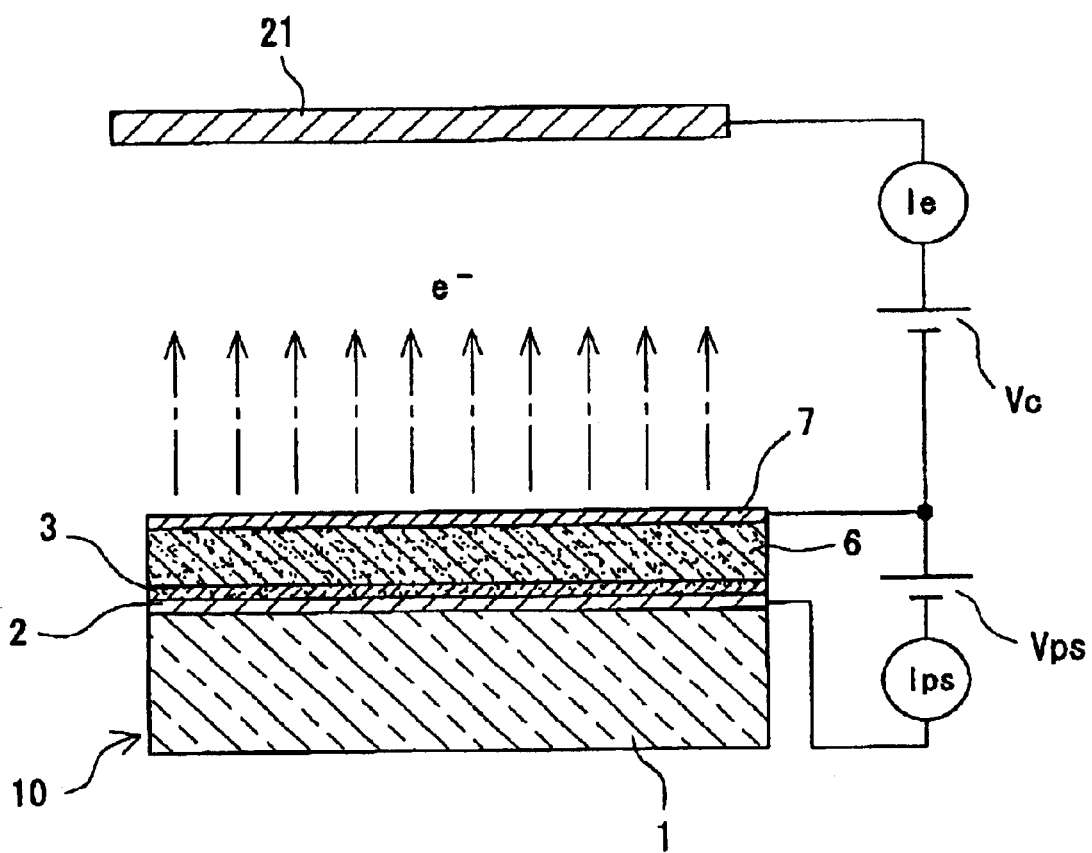
FIG. 2 is an explanatory diagram of a general electron emission operation of electron sources according to first to fourth embodiments of the present invention.

For the purpose of allowing electrons to be emitted from the electron source 10, a collector 21 may be positioned opposed to the surface electrode 7, as shown in FIG. 2. Then, after evacuating the space between the surface electrode 7 and the collector 21 to provide a vacuum space, a DC voltage Vps is applied between the surface electrode 7 and the lower electrode 2 such that the surface electrode 7 has a higher potential than that of the lower electrode 2, and simultaneously a DC voltage Vc is applied between the collector 21 and the surface electrode 7 such that the collector 21 has a higher potential than that of the surface electrode 7. By appropriately setting the DC voltages Vps and Vc, electrons are injected from the lower electrode 2 to the electron transit layer 6, and then emitted through the surface electrode 7 after drifting within the electron transit layer 6. The one-dot chain lines in FIG. 2 indicate the flow of the electrons e⁻ emitted through the surface electrode 7. The electron reaching the surface of the electron transit layer 6 can be considered as a hot electron. Thus, after readily tunneling through the surface electrode 7, the electron will be emitted into the vacuum space. In the first embodiment, electrons pass through the electron transit layer 6 under an electric field between the lower electrode 2 and the surface electrode 7 which is induced when the voltage is applied between the lower and surface electrodes. The electrons are moved from the lower electrode 2 to the surface electrode 7 through the electron transit layer 6 by the electric field caused when the surface electrode 7 has a higher potential than that of the lower electrode 2.

In the electron source 10 according to the first embodiment, greater ratio (Ie/Ips) of the emission current Ie flowing between the collector 21 and the surface electrode 7 to the diode current Ips flowing between the surface electrode 7 and the lower electrode 2 provides higher electron emitting efficiency.

Figure 3:
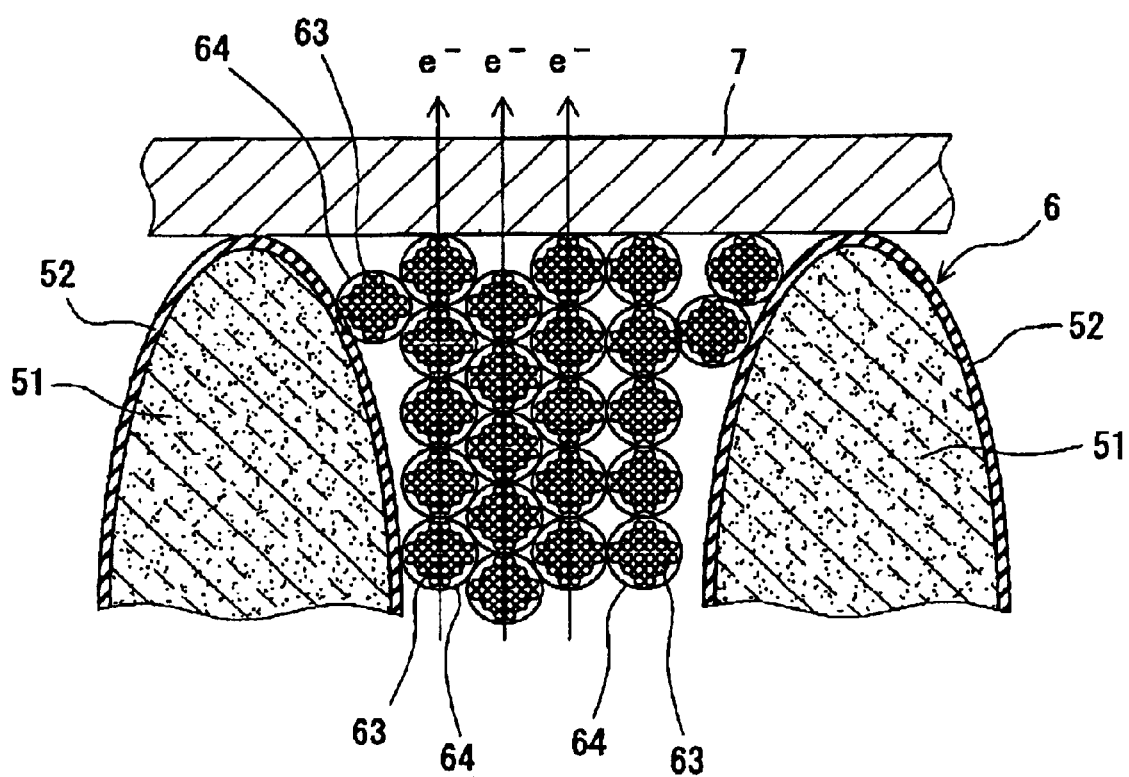
FIG. 3 is an explanatory diagram of a microscopic electron emission operation of the electron sources according to the first to fourth embodiments of the present invention.

As shown in FIG. 3, it can be assumed that the electron transit layer 6, at least, includes a plurality of columnar polycrystalline silicon grains 51 (semiconductor crystals) disposed along with each other on the side of the selected principal surface of the substrate 1, a thin silicon oxide film 52 formed on each surface of the grains 51, a number of nano-order silicon nanocrystals 63 (semiconductor nanocrystals) interposed between the adjacent grains 51, and a number of silicon oxide films 64 each of which is formed on each surface of the silicon nanocrystals 63 and is composed of an insulating film having a film thickness less than each crystal grain size of the silicon nanocrystals 63. That is, in the electron transit layer 6, each of the grains has a porous surface, and a crystalline state is maintained at each central region of the grains. Each of the grains 51 extends in the direction perpendicular to the lower electrode 2 or in the thickness direction of the lower electrode 2.

In the electron source 10 according to the first embodiment, the electron emission would be caused based on the following model.

A DC voltage Vps is applied between the surface electrode 7 and the lower electrode 2 such that the surface electrode 7 has a higher potential than that of the lower electrode 2, and simultaneously a DC voltage Vc is applied between the collector 21 and the surface electrode 7 such that the collector 21 has a higher potential than that of the surface electrode 7. When the DC voltage Vps reaches a given value (critical value), electrons e⁻ are injected from the lower electrode 2 into the electron transit layer 6 under thermal excitation. At the same time, the electric field applied to the electron transit layer 6 mostly acts to the silicon oxide films 64. Thus, the injected electrons e⁻ are accelerated by the strong electric field acting to the silicon oxide films 64. Then, the electrons drift toward the surface electrode or in the direction of the arrows in FIG. 3 through the region between the adjacent grains 51 in the electron transit layer 6. After tunneling through the surface electrode 7, the electrons are emitted from the surface electrode 7 to the vacuum space. The electrons injected from the lower electrode 2 into the electron transit layer 6 are accelerated by the electric field acting to silicon oxide films 64, and then emitted through the surface electrode 7 after drifting approximately without scattering due to the silicon nanocrystals 63 (ballistic electron emission phenomenon). Further, heat generated at the electron transit layer 6 can be released through the grains 51. Thus, during electron emission, the electrons can be stably emitted without occurrence of the popping phenomenon. The electrons reaching the surface of the electron transit layer 6 (hot electrons) are emitted into the vacuum space after readily tunneling through the surface electrode 7. The electron source based on such an operational principle is referred to as Ballistic electron Surface-emitting Device.

As described above, the lower electrode 2 and the surface electrode 7 is made of conductive carbide. Generally, the conductive carbide has a relatively high conductivity and a relatively low work function. The conductive carbide also has a melting point higher than that of noble metal such as gold, and an excellent diffusion barrier performance. In addition, the conductive carbide has an oxidation resistance superior to that of metal such as tungsten or aluminum. The conductive carbide having these properties includes chromium carbide, molybdenum carbide, tungsten carbide, vanadium carbide, niobium carbide, tantalum carbide, titanium carbide, zirconium carbide, and hafnium carbide. In view of thermal stability, work function and reproducibility, it is preferable to use titanium carbide, zirconium carbide or hafnium carbide.

In the electron source 10 according to the first embodiment, the lower electrode 2 and the surface electrode 7 is made of layer-structured conductive carbide. Thus, as compared to an electron source having lower and surface electrodes made of a metal, the electron source according to the first embodiment can provide enhanced thermal resistance of the lower electrode 2 and the surface electrode 7 while suppressing the deterioration of electron emission characteristics. This makes it possible to prevent not only the increase of electrical resistance in the lower electrode 2 and the surface electrode 7 due to a thermal process such as a vacuum-sealing process but also agglomeration in the surface electrode 7, and thereby to avoid undesirable deterioration of electron emission characteristics. Further, the lower electrode 2 made of the conductive carbide can prevent respective atoms constituting the substrate 1 and the semiconductor layer 3 (the electron transit layer 6 in case of omitting the semiconductor layer 3) from being diffused therebetween. Thus, the materials of the substrate 1 and the semiconductor layer 3 (the electron transit layer 6 in case of omitting the semiconductor layer 3) can be selected from various alternatives. Similarly, the surface electrode 7 made of the conductive carbide can prevent respective atoms constituting the surface electrode 7 and the electron transit layer 6 from being diffused therebetween. Thus, the materials of the surface electrode 7 and the electron transit layer 6 can be selected from various alternatives.

In the first embodiment, each of the lower electrode 2 and the surface electrode 7 is entirely made of layer-structured conductive carbide. Alternatively, at least a portion of each of the lower electrode 2 and the surface electrode 7 may be made of layer-structured conductive carbide, and the remaining potion may be made of metal such as Cr, W, Ti, Al, Cu, Au, Pt or Mo; alloy containing such metal; or semiconductor material such as impurity-doped polycrystalline silicon. Further, either one of the lower electrode 2 and the surface electrode 7 may be devoid of the conductive carbide. For example, the lower electrode 2 or the surface electrode 7 may be made by using metal such as Cr, W, Ti, Al, Cu, Au, Pt or Mo; alloy containing such metal; or semiconductor material such as impurity-doped polycrystalline silicon. In this case, the deterioration of electron emission characteristics can also be suppressed as compared to the conventional electron sources.

When a glass substrate is used as the substrate 1, the glass substrate may be appropriately selected from a silica glass substrate, no-alkali glass substrate, low-alkali glass substrate or soda-lime glass substrate, depending on a process temperature. In case of employing a ceramic substrate, the substrate 1 may be composed, for example, of an alumina substrate. The electron source 10 according to the first embodiment may be used as an electron source for display devices. In this case, a suitable patterning of the lower electrode 2, the surface electrode 7 and the electron transit layer 6 may be appropriately selected.

With reference to FIGS. 4A to 4D, a manufacturing process of the electron source 10 according to the first embodiment will be described below.

Figure 4A:
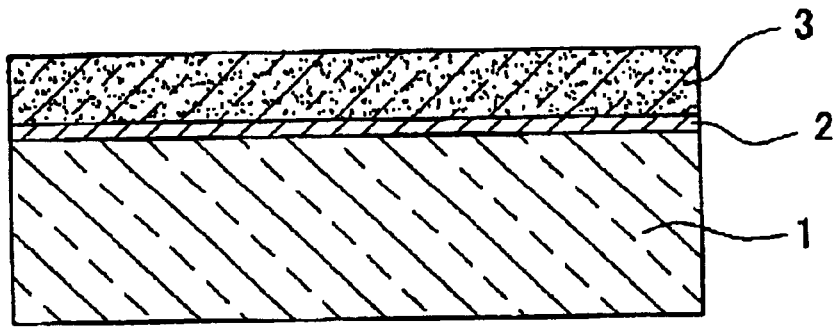
FIGS. 4A to 4D are sectional views of in-process and final products provided in major steps of a manufacturing process of the electron source according to the first embodiment of the present invention.

A lower electrode 2 composed of a conductive carbide layer is first formed on one of the principal surfaces of a substrate 1 through a sputtering method or another suitable method. Then, a semiconductor layer or a non-doped polycrystalline silicon layer 3 is formed on the side of the selected principal surface of the substrate 1 (on the lower electrode 2 herein). Through the above step, the structure as shown in FIG. 4A is obtained. A film forming method for a conductive carbide layer serving as the lower electrode 2 will be described later. The polycrystalline silicon layer 3 may be formed through various film forming methods such as a CVD method (e.g. LPCVD method, plasma CVD method or catalytic-CVD method), a sputtering method or a CGS (Continuous Grain Silicon) method.

Figure 4B:
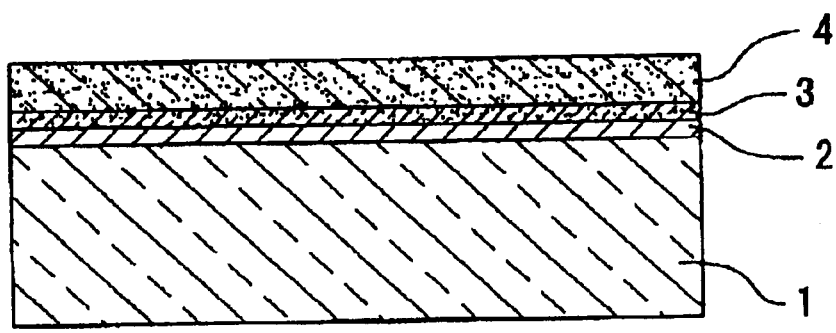

After the non-doped polycrystalline silicon layer 3 has been formed, a porous region is provided up to a given depth of the polycrystalline silicon layer 3 by means of an anodizing process. Through this step, a porous semiconductor layer or a porous polycrystalline silicon layer 4 is formed, and thus the structure as shown in FIG. 4B is obtained. In the anodizing process, a processing bath is used which contains an electrolytic solution consisting of a mixture prepared by mixing a water solution containing 55 wt % of hydrogen fluoride with ethanol at the ratio of about 1:1. The anodizing process is performed by immersing a platinum electrode (not shown) and the lower electrode 2 into the processing bath, and applying a certain voltage between the platinum electrode and the lower electrode 2 at a constant current while irradiating the polycrystalline silicon layer 3 with light, to form the porous polycrystalline silicon layer 4. The obtained porous polycrystalline silicon layer 4 includes a polycrystalline silicon grain and a silicon nanocrystal. While the porous region is formed in a portion (up to a given depth) of the polycrystalline silicon layer 3 in the first embodiment, the porous region may be formed in the entire polycrystalline silicon layer 3 (up to a depth reaching the substrate 1).

Figure 4C:
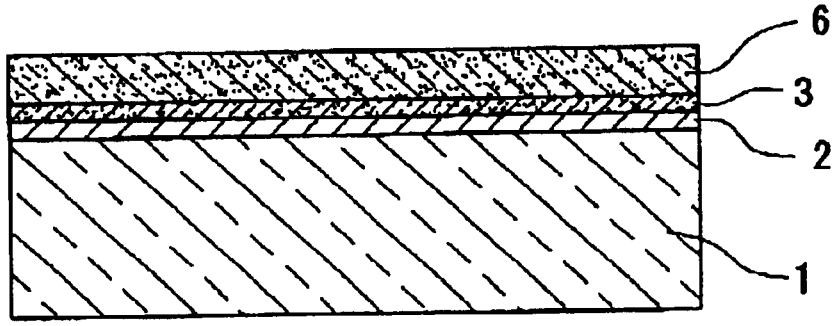

After the completion of the anodizing process, the porous polycrystalline silicon layer 4 is oxidized through an oxidation process. Through this step, an electron transit layer 6 composed of the oxidized porous polycrystalline silicon layer is formed, and thus the structure as shown in FIG. 4C is obtained. In the oxidation process, the porous polycrystalline silicon layer 4 is oxidized, for example, through a rapid heating method to form the electron transit layer 6 including the grains 51, the silicon nanocrystals 63, and the silicon oxide films 52, 64 (see FIG. 3).

A lamp annealing apparatus is used in the rapid heating method for the oxidation process. A furnace is kept in $O_2$ gas atmosphere. The substrate is heated from room temperature up to a given oxidation temperature (e.g. 900° C.) at a specific programming rate (e.g. 80° C./sec). The substrate is maintained at the oxidation temperature only for a given oxidation time-period (e.g. one hour) to perform a rapid thermal oxidation (RTO) processing. Then, the substrate is cooled down to room temperature. The oxidation process is not limited to the rapid heating method. For example, the electron transit layer 6 including the grains 51, the silicon nanocrystals 63 and the silicon oxide films 52, 64 may be formed by using an oxidation-processing bath containing an electrolytic solution (e.g. 1 mole/L of $H_2SO_4$, 1 mole/L of $HNO_3$, or aqua regia), and applying a constant current between a platinum electrode (not shown) and the lower electrode 2 to electrochemically oxidize the porous polycrystalline silicon layer 4.

Figure 4D:
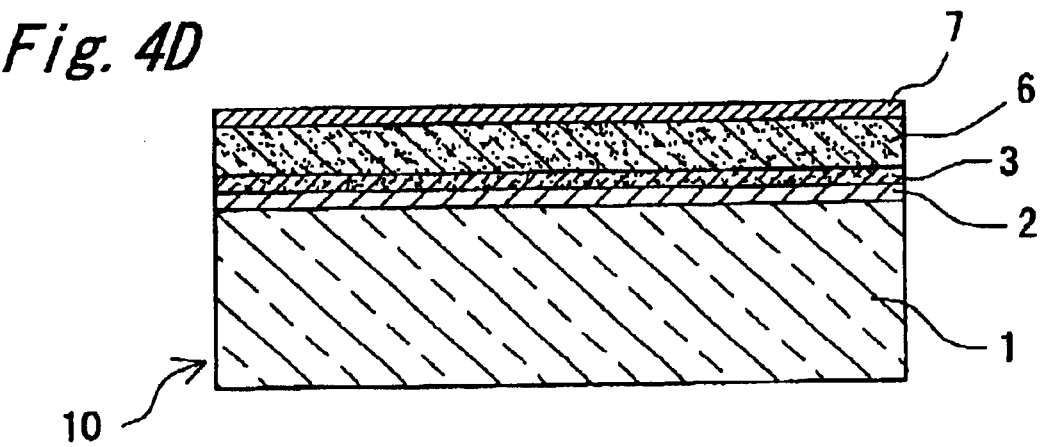

After the electron transit layer 6 has been formed, a surface electrode 7 composed of a conductive carbide layer is formed on the electron transit layer 6, for example, through a sputtering method. Through this step, the electron source 10 as shown in FIG. 4D is obtained. A film forming method for the conductive carbide layer serving as the surface electrode 7 will be described later in conjunction with the film forming method for the lower electrode 2.

The manufacturing process of the electron source 10 according to the first embodiment can provide the electron source 10 having enhanced thermal resistance with suppressing the deterioration of electron emission characteristics.

In the first embodiment, the lower electrode 2 and the surface electrode 7 each composed of the conductive carbide layer are formed through a sputtering method. A usable sputtering method may be selected from various types such as an RF sputtering method, RF magnetron sputtering method, DC sputtering method and DC magnetron sputtering method. In this case, the conductive carbide layer is formed through a sputtering method using a target consisting of conductive carbide. These methods can provide the conductive carbide layer with excellent stability and reproducibility as well as a high throughput, which achieves a reduced manufacturing cost and an increased electron emitting area of the electron source 10. In addition, an existing sputtering apparatus can be readily diverted to an apparatus for forming the conductive carbide layer, which provides a downsized equipment investment and a reduced equipment cost. Thus, the electron source 10 having enhanced thermal resistance with suppressing the deterioration of electron emission characteristics can be provided at a lower cost. Further, the conductive carbide layer can be formed at a relatively low process temperature.

The film forming method for the conductive carbide layer is not limited to the aforementioned sputtering methods. For example, the conductive carbide layer may be formed through a vacuum evaporation method using a deposition source consisting of conductive carbide, or a reactive sputtering method using a target consisting of metal (pure metal) and gas (reactive gas) including carbon. The vacuum evaporation method or the reactive sputtering method can also provide the conductive carbide layer with excellent stability and reproducibility as well as a high throughput, which achieves a reduced manufacturing cost and an increased electron emitting area of the electron source 10. Thus, the electron source 10 having enhanced thermal resistance with suppressing the deterioration of electron emission characteristics can be provided at a lower cost. Further, the conductive carbide layer can be formed at a relatively low process temperature. In addition, when the conductive carbide layer is formed through the vacuum evaporation method, an existing vacuum evaporation apparatus can be readily diverted to an apparatus for forming the conductive carbide layer, which provides a downsized equipment investment and a reduced equipment cost.

An EB (Electron Beam) vacuum evaporation method is one of appropriate vacuum evaporation methods to be used, because conductive carbide has a high melting point. On the other hand, the reactive sputtering method using a target consisting of metal (pure metal) and gas (reactive gas) including carbon can facilitate the control of carbon concentration in the conductive carbide layer. That is, in the reactive sputtering method, a type of the reactive gas or a mixing ratio of inert gas such as Ar to the reactive gas including carbon atoms can be appropriately selected to control a carbon concentration in the conductive carbide layer so as to provide the conductive carbide layer having a desired carbon concentration. Further, as compared to the carbide target, the pure metal target having a higher purity is widely placed on the market. Thus, the reactive sputtering method can provide the conductive carbide layer including a less amount of metal impurities as compared to the sputtering method using conductive carbide as a target, and thereby performance decrement due to impurities can be suppressed.

The film forming method for the conductive carbide layer may further include a method of annealing a metal film (e.g. titanium film, zirconium film or hafnium film) under gas atmosphere including carbon. This method is advantageously to improve the purity and film quality of the conductive carbide layer. The film forming method for the metal film may include a CVD method, vacuum evaporation method and sputtering method. In view of productivity and film quality, it is preferable to use a DC magnetron sputtering method using Ar gas. For example, when $CH_4$ gas is used as the gas including carbon, the conductive carbide layer can be formed by annealing the metal film at a temperature of 1000° C. Thus, as with the aforementioned film forming methods for the conductive carbide layer, the method of annealing a metal film under gas atmosphere including carbon can provide the conductive carbide layer with excellent reproducibility and stability. This makes it possible to achieve a reduced manufacturing cost and an increased electron emitting area of the electron source 10. In addition, an existing apparatus (DC magnetron sputtering apparatus or appealing apparatus) can be readily diverted to an apparatus for forming the conductive carbide layer, which provides a downsized equipment investment and a reduced equipment cost. Thus, the electron source 10 having enhanced thermal resistance with suppressing the deterioration of electron emission characteristics can be provided at a lower cost. Further, as compared to the reactive sputtering method, defects due to plasma damages will be reduced to form the conductive carbide layer having a higher purity and film quality. From this point of view, the above annealing method is suitable for forming the lower electrode 2, particularly, in a ceramic substrate used as the substrate 1.

Alternatively, the conductive carbide layer may be formed through a CVD method. The CVD method can provide the conductive carbide layer with excellent reproducibility and stability as well as a high throughput, which achieves a reduced manufacturing cost and an increased electron emitting area of the electron source 10. Thus, the electron source 10 having enhanced thermal resistance with suppressing the deterioration of electron emission characteristics can be provided at a lower cost. Further, the CVD method is excellent in a step-coverage performance. In the CVD method, an organic metal compound such as $(C_5H_5)_2$ Ti $Cl_2$ (Dichlorotitanocene) may be used as a deposition source. However, it is desired to use chloride such as titanium chloride, zirconium chloride or hafnium chloride, in view of a problem of stability of the deposition source itself. A mixed gas of hydrogen and gas including carbon atom such as $CH_4$ (methane), $C_3H_8$ (propane), $C_6H_5CH_3$ (toluene), $CCl_4$ (carbon tetrachloride) or $CH_3OH$ (methanol) may be used as the reactive gas. Since a thermal CVD method involves a process temperature of 600° C. or more, it is preferable to use the plasma CVD method capable of lowering the process temperature.

The conductive carbide layer may be formed by annealing a multilayer consisting of a metal film (e.g. titanium film) and a carbon film. Alternatively, the conductive carbide layer may be formed by annealing a film made of a mixture of metal (e.g. titanium) and carbon. Theses methods can also provide the conductive carbide layer with excellent reproducibility and stability, which achieves a reduced manufacturing cost and an increased electron emitting area of the electron source 10. Thus, the electron source 10 having enhanced thermal resistance with suppressing the deterioration of electron emission characteristics can be provided at a lower cost.

In the first embodiment, the electron transit layer 6 is composed of the oxidized porous polycrystalline silicon layer. Alternatively, the electron transit layer 6 may be composed of a nitrided porous polycrystalline silicon layer or an oxynitrided porous polycrystalline silicon layer. Further, the electron transit layer 6 may be composed of any other suitable oxidized, nitrided or oxynitrided porous semiconductor layer. When the electron transit layer 6 is composed of the nitrided porous polycrystalline silicon layer, a nitriding process of nitriding the porous polycrystalline silicon layer 4 through a rapid heating method using $NH_3$ gas may be employed, as a substitute for the oxidation process of oxidizing the layer 4 through the rapid heating method using $O_2$ gas. Further, when the electron transit layer 6 is composed of the oxynitrided porous polycrystalline silicon layer, an oxynitriding process of oxynitriding the porous polycrystalline silicon layer 4 through a rapid heating method using a mixed gas of $O_2$ gas and $NH_3$ gas may be employed, as a substitute for the oxidation process of oxidizing the layer 4 through the rapid heating method using $O_2$ gas. In this case, a silicon oxynitride film will be formed instead of the silicon oxide films 52, 64 in FIG. 3.

(Second Embodiment)

A second embodiment of the present invention will be described below.

Figure 5A:
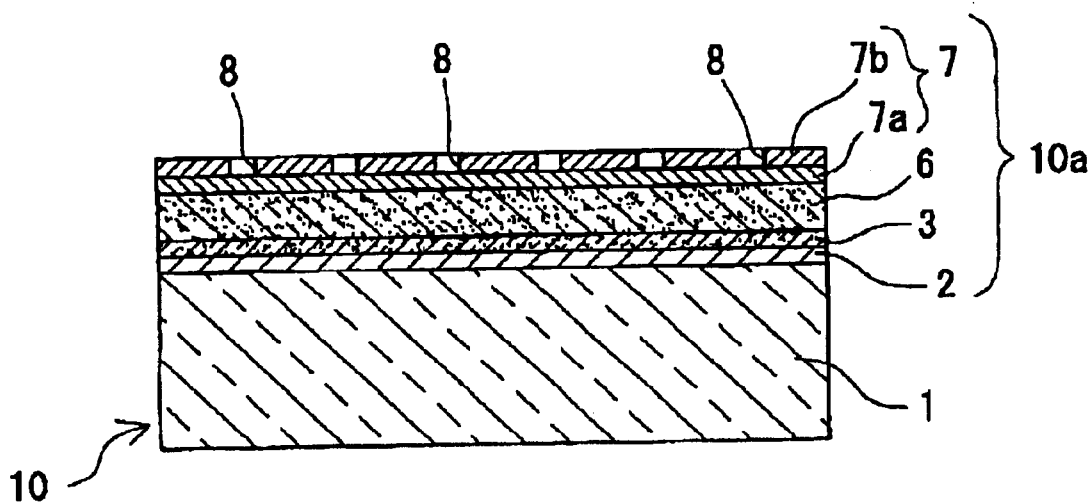
FIGS. 5A and 5B are sectional and top plan views of the electron source according to the second embodiment of the present invention, respectively.
Figure 5B:
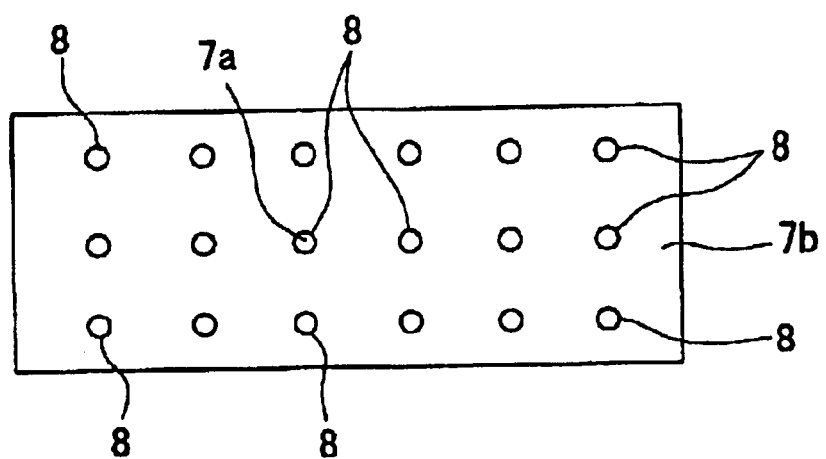

As shown in FIGS. 5A and 5B, an electron source 10 according to the second embodiment comprises a substrate 1 composed of an insulative substrate (e.g. insulative glass substrate or insulative ceramic substrate), and an electron source device 10a formed on one of the principal surfaces of the substrate 1. The electron source device 10a comprises a lower electrode 2 formed on the selected principal surface of the substrate 1, a semiconductor layer or a non-doped polycrystalline silicon layer 3 formed on the lower electrode 2, an after-mentioned electron transit layer 6 formed on the polycrystalline silicon layer 3, and a surface electrode 7 formed on the electron transit layer 6. Specifically, in the electron source device 10a, the surface electrode 7 and the lower electrode 2 are disposed opposed to one another, and the electron transit layer 6 is interposed between the surface and lower electrodes. The thickness of the lower electrode 2 is set at about 300 nm, and the thickness of the surface electrode 7 is set such that it does not exceed 10 nm. While the second embodiment employs the insulative substrate as the substrate 1, any other suitable semiconductor substrate such as a silicon substrate may be used as the substrate 1, and the lower electrode 2 may be comprised of the semiconductor substrate and a conductive layer (e.g. ohmic electrode) deposited on the semiconductor substrate. Further, while the polycrystalline silicon layer 3 is interposed between the electron transit layer 6 and the lower electrode 2 in the first embodiment, the electron transit layer 6 may be formed directly on the lower electrode 2 without interposing the polycrystalline silicon layer 3.

The lower electrode 2 is composed of a single layer thin-film made of a metal (e.g. Mo, Cr, W, Ti, Ta, Ni, Al, Cu, Au or Pt; alloy containing such metal; or intermetallic compound such as silicide). Alternatively, the lower electrode 2 may be composed of a multilayer thin-film made of such a metal. Further, the lower electrode 2 may be made of a semiconductor material such as impurity-doped polycrystalline silicon.

The electron transit layer 6 is formed by subjecting the polycrystalline silicon layer to a anodizing process and an oxidation process as described later. As with the electron transit layer 6 in the first embodiment, the electron transit layer 6 in the second embodiment includes grains 51, silicon oxide films 52, silicon nanocrystals 63, and silicon oxide films 64 (see FIG. 3). In the second embodiment, the remaining region other than the grains 51, silicon nanocrystals 63 and silicon oxide films 52, 64 is formed as an amorphous region made of amorphous silicon or partially oxidized amorphous silicon. Thus, the polycrystalline silicon and the number of silicon nanocrystals 63 residing adjacent to the grain boundary of the polycrystalline silicon are mixed together within the electron transit layer 6.

The surface electrode 7 is composed of a multilayer film having a conductive carbide or conductive nitride layer 7a deposited on the electron transit layer 6 and a noble metal layer 7b deposited on the conductive carbide or conductive nitride layer 7a. The surface of the multilayer film is formed with a number of concave portions 8 allowing the multilayer film to have a locally reduced thickness. In view of thermal stability and reproducibility in a film forming process, it is preferable to use titanium carbide, zirconium carbide, hafnium carbide, titanium nitride, zirconium nitride, hafnium nitride, niobium nitride, tantalum nitride or the like.

The noble metal layer 7b is made of platinum as a noble metal. While the noble metal is not limited to platinum and the noble metal layer 7b may be made, for example, of gold or iridium, it is preferable to use platinum in view of reproducibility in a film forming process.

In order to provide increased emission current and enhanced emitting efficiency, it is required to reduce the thickness of the surface electrode 7. For this purpose, the thickness of the conductive carbide or conductive nitride layer 7a is set such that it does not exceed 4 nm, and the total thickness of the conductive carbide or conductive nitride layer 7a and the noble metal layer 7b is set such that it does not exceed 10 nm. As described above, the surface of the surface electrode 7 is formed with the number of concave portions 8. In the region having the concave portions 8, the surface of the conductive carbide or conductive nitride layer 7a is exposed to outside. That is, the depth of the concave portion 8 is approximately equal to the thickness of the noble metal layer 7b. However, the depth of the concave portion 8 may be less than, for example about one-half of, the thickness of the noble metal layer 7b.

In the electron source 10 or the electron source device 10a as a ballistic electron surface-emitting type electron source according to the second embodiment, steps of emitting electrons or an electron emission model is the same as that of the electron source 10 according to the first embodiment (see FIGS. 2 and 3). Thus, as with the electron source 10 according to the first embodiment, the electron source 10 according to the second embodiment exhibits enhanced electron emission characteristics having a low dependence on vacuum degree and free from the popping phenomenon, and thereby can emit electrons stably.

As above, in the electron source 10 according to the second embodiment, the surface electrode 7 is composed of the conductive carbide or conductive nitride layer 7a and the noble metal layer 7b, and the surface of the multilayer film is formed with the number of concave portions 8 allowing the multilayer film to have a locally reduced thickness. Thus, an energy loss due to electron scattering caused in the surface electrode 7 will be reduced in the region of the surface electrode 7 formed with the concave portions 8 as comparted to other region. Further, electron emission characteristics can be enhanced while suppressing the increase of electrical resistance in the surface electrode 7, because the electrical resistance of the surface electrode 7 is substantially determined by the film thickness of the multilayer film composed of the conductive carbide or conductive nitride layer 7a and the noble metal layer 7b.

When a glass substrate is used as the substrate 1, the glass substrate may be appropriately selected from a silica glass substrate, no-alkali glass substrate, low-alkali glass substrate or soda-lime glass substrate, depending on a process temperature. In case of employing a ceramic substrate, the substrate 1 may be composed, for example, of an alumina substrate. The electron source 10 according to the first embodiment may be used as an electron source for display devices. In this case, a suitable patterning of the lower electrode 2, the surface electrode 7 and the electron transit layer 6 may be appropriately selected.

With reference to FIGS. 6A to 6E, a manufacturing process of the electron source 10 according to the second embodiment will be described below.

Figure 6A:
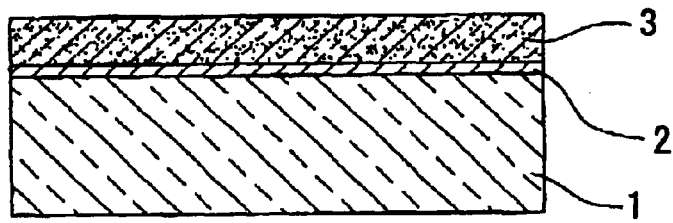
FIGS. 6A to 6E are sectional views of in-process and final products provided in major steps of a manufacturing process of the electron source according to the second embodiment of the present invention.

A lower electrode 2 composed of a metal film (e.g. molybdenum film) having a given film thickness (e.g. about 300 nm) is first formed on one of the principal surfaces of a substrate 1 composed of a silica glass substrate. Then, a non-doped polycrystalline silicon layer 3 having a given film thickness (e.g. 1.5 μm) is formed on the lower electrode 2 to provide the structure as shown in FIG. 6A. The lower electrode 2 may be formed, for example, through a sputtering method or a CVD method. Alternatively, the lower electrode 2 may be formed through a method of forming a non-doped polycrystalline silicon layer and then doping an n-type impurity into the polycrystalline silicon layer by means of a thermal diffusion method, or another method of forming a non-doped polycrystalline silicon layer and simultaneously doping an n-type impurity into the polycrystalline silicon layer (i.e. forming an conductive polycrystalline silicon layer directly on the substrate 1 without using an ion-implantation method or thermal diffusion method).

By using the co-doping method of doping simultaneously with film formation as the method for forming the lower electrode 2, the lower electrode 2 and the non-doped polycrystalline silicon layer 3 can be continuously formed by the same film forming apparatus without any carry-in-and-out operation. The lower electrode 2 is not limited to the n-type polycrystalline silicon layer, and it may be composed of a p-type polycrystalline silicon layer. In this case, a p-type impurity may be doped in the non-doped polycrystalline silicon layer 3. The non-doped polycrystalline silicon layer 3 may be formed through various film forming methods such as a CVD method (e.g. LPCVD method, plasma CVD method or catalytic-CVD method), a sputtering method, a CGS method, or a method of depositing amorphous silicon and then laser-annealing the amorphous silicon.

Figure 6B:
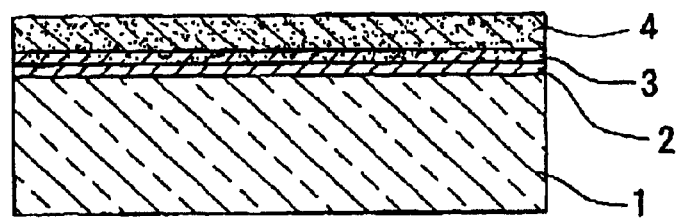

After the non-doped polycrystalline silicon layer 3 has been formed, an anodizing process is performed to form a porous polycrystalline silicon layer 4 in which polycrystalline silicon grains 51 (see FIG. 3), silicon nanocrystals 63 (see FIG. 3) and amorphous silicons are mixed together. Through this step, the structure as shown in FIG. 6B is obtained. Hereupon, the procedure for performing the anodizing process is as same as that of the first embodiment.

Figure 6C:
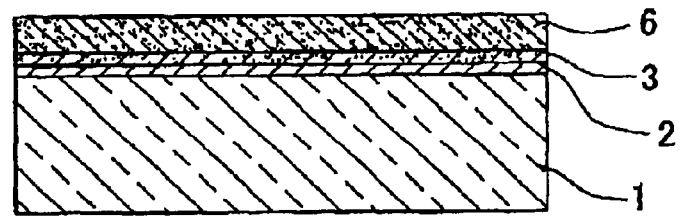

After the completion of the anodizing process, an oxidation process is performed to form an electron transit layer 6 composed of the composite nanocrystal layer having the structure as shown in FIG. 3. Through this step, the structure as shown in FIG. 6C is obtained.

In the oxidation process, the porous polycrystalline silicon layer 4 is oxidized, for example, through a rapid is heating method to form the electron transit layer 6 (see FIG. 3) including the grains 51, the silicon nanocrystals 63, and the silicon oxide films 52, 64. The procedure for performing the oxidation process is as same as that of the first embodiment.

After the electron transit layer 6 has been formed, a conductive carbide or conductive nitride layer 7a having a given film thickness (appropriately selected in the range of 1 nm to 4 nm) and a noble metal layer 7b having a given film thickness (e.g. 3 nm) are sequentially formed on the electron transit layer 6, for example, through a sputtering method.

Figure 6D:
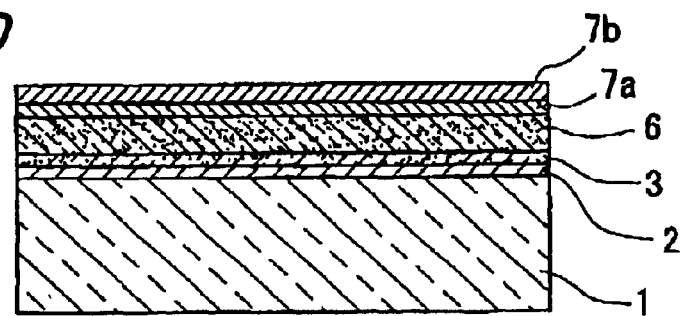

Through this step, a multi layer composed of the conductive carbide or conductive nitride layer 7a and the noble metal layer 7b is formed, and the structure as shown in FIG. 6D is obtained. A method for forming the conductive carbide or conductive nitride layer 7a may be selected from various thin-film forming methods such as a sputtering method (e.g. RF sputtering method, RF magnetron sputtering method, DC sputtering method, DC magnetron sputtering method, or reactive sputtering method), a vacuum evaporation method, and a CVD method. Alternatively, the conductive carbide or conductive nitride layer 7a may be formed through a method of depositing a metal film on the electron transit layer 6 by means of the sputtering method or vacuum evaporation method and then annealing the metal film under gas atmosphere including carbon or nitrogen, or through another method of depositing a metal film on the electron transit layer 6 by means of the sputtering method or vacuum evaporation method and then implanting carbon ion or nitrogen ion into the metal film. A method for forming the noble metal layer 7b may be selected from various thin-film forming methods such as a sputtering method (e.g. RF sputtering method, RP magnetron sputtering method, DC sputtering method or DC magnetron sputtering method), a vacuum evaporation method, and a CVD method.

Figure 6E:
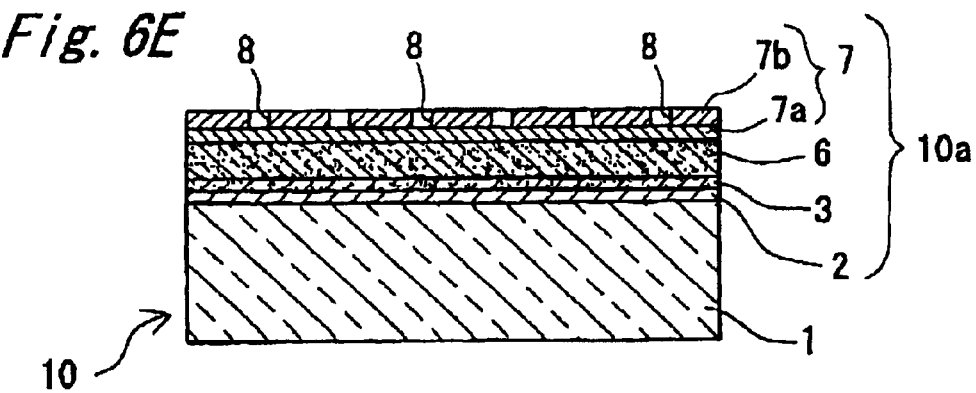

Then, through a heat treatment process, a number of concave portions are formed on the multilayer composed of the conductive carbide or conductive nitride layer 7a and the noble metal layer 7b, and the electron source 10 having the structure as shown in FIG. 6E is obtained. In the heat treatment process, the multilayer is subjected to a heat treatment at a temperature in the range of 300° C. to 450° C. for a given time-period (e.g. 15 minutes to 120 minutes) under nitrogen atmosphere. Thus, the concave portion can be formed at a relatively low process temperature. While the heat treatment is performed under nitrogen atmosphere in this heat treatment process, it may be performed under any other suitable inert gas atmosphere or in vacuum. A usable heat treatment may include an annealing using an electric furnace, an annealing based on light irradiation (e.g. lamp annealing), and a laser annealing.

The manufacturing process of the electron source 10 according to the second embodiment can facilitate manufacturing the electron source 10 having enhanced electron emitting efficiency with suppressing the increase of electrical resistance in the surface electrode 7.

In the second embodiment, also, the oxidation process may be substituted with a nitriding process or an oxynitriding process as same as the case of the first embodiment.

In the second embodiment, the electron transit layer 6 is composed of the composite nanocrystal layer as shown in FIG. 3. Alternatively, the electron transit layer 6 may be composed of an insulative layer made, for example, of $Al_2O_3$, $SiO_2$ or the like. In this case, the electron source provided with a semiconductor layer can operate as with an electron source having the MIS structure. On the other hand, the electron source provided with no semiconductor layer can operate as with an electron source having the MIM structure. In either electron source, electron emission characteristics can be improved by appropriately setting the thickness of the electron transit layer. In addition, the forming process of the electron transit layer can be simplified.

(Third Embodiment)

A third embodiment of the present invention will be described below.

Figure 7:
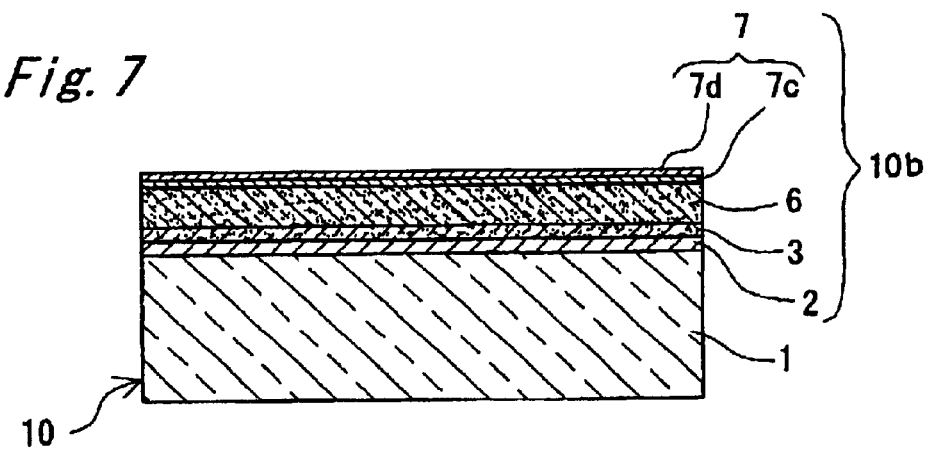
FIG. 7 is a sectional view of the electron source according to the third embodiment of the present invention.

As shown in FIG. 7, an electron source 10 according to the third embodiment comprises a substrate 1 composed of an insulative substrate (e.g. insulative glass substrate or insulative ceramic substrate), and an electron source device 10a formed on one of the principal surfaces of the substrate 1. The electron source device 10b comprises a lower electrode 2 formed on the selected principal surface of the substrate 1, a semiconductor layer or a non-doped polycrystalline silicon layer 3 formed on the lower electrode 2, an after-mentioned electron transit layer 6 formed on the polycrystalline silicon layer 3, and a surface electrode 7 formed on the electron transit layer 6. In the electron source device 10b, the surface electrode 7 and the lower electrode 2 are disposed opposed to one another, and the electron transit layer 6 is interposed between the surface and lower electrodes. The thickness of the lower electrode 2 is set at about 300 nm, and the thickness of the surface electrode 7 is set such that it does not exceed 10 nm.

While the third embodiment employs the insulative substrate as the substrate 1, any other suitable semiconductor substrate such as a silicon substrate may be used as the substrate 1, and the lower electrode 2 may be comprised of the semiconductor substrate and a conductive layer (e.g. ohmic electrode) deposited on the semiconductor substrate. Further, while the polycrystalline silicon layer 3 is interposed between the electron transit layer 6 and the lower electrode 2, the electron transit layer 6 may be formed directly on the lower electrode 2 without interposing the polycrystalline silicon layer 3.

The lower electrode 2 is composed of a thin film made of the same metal as that of the lower electrode 2 of the electron source according to the second embodiment.

The electron transit layer 6 is formed by subjecting the polycrystalline silicon layer to a anodizing process and an oxidation process as described later. The electron transit layer 6 in the third embodiment includes grains 51, silicon oxide films 52, silicon nanocrystals 63, and silicon oxide films 64 as with the electron transit layer 6 in the first embodiment (see FIG. 3), and the remaining region other than the grains 51, silicon nanocrystals 63 and silicon oxide films 52, 64 is formed as an amorphous region made of amorphous silicon or partially oxidized amorphous silicon as with the electron transit layer 6 in the second embodiment.

The surface electrode 7 is composed of a conductive nitride layer 7c deposited on the electron transit layer 6 and a metal layer 7d deposited on the conductive nitride layer 7c. The conductive nitride layer 7c is made of conductive nitride consisting of titanium nitride. Generally, the conductive nitride has a relatively high conductivity, a melting point higher than that of noble metal such as gold, and an excellent diffusion barrier performance. In addition, the conductive nitride has an oxidation resistance superior to that of metal such as tungsten or aluminum. The conductive nitride having these properties usable in the conductive nitride layer 7c is not limited to titanium nitride, and it may be chromium nitride, molybdenum nitride, tungsten nitride, vanadium nitride, niobium nitride, tantalum nitride, zirconium nitride, or hafnium nitride. In view of thermal stability, work function and reproducibility, it is preferable to use either one of titanium nitride, zirconium nitride, hafnium nitride, niobium nitride and tantalum nitride.

The metal layer 7d is made of platinum which is one of noble metals. The material of the metal layer 7d is not limited to platinum, and the metal layer 7d may be made of any other suitable noble metal such as gold or iridium. However, platinum is particularly effective to assure thermal stability.

In the surface electrode 7, the thickness of the conductive nitride layer 7c is set such that it does not exceed 4 nm, and the total thickness of the conductive nitride layer 7c and the metal layer 7d is set such that it does not exceed 10 nm, in order to suppress the deterioration of electron emitting efficiency or provide other advantages.

In the electron source 10 or the electron source device 10b as a ballistic electron surface-emitting type electron source according to the third embodiment, steps of emitting electrons or an electron emission model is the same as that of the electron source 10 according to the first embodiment (see FIGS. 2 and 3). Thus, as with the electron source 10 according to the first embodiment, the electron source 10 according to the third embodiment exhibits enhanced electron emission characteristics having a low dependence on vacuum degree and free from the popping phenomenon, and thereby can emit electrons stably.

In the electron source 10 according to the third embodiment, the surface electrode 7 is composed of the conductive nitride layer 7c made of conductive nitride and deposited on the electron transit layer 6, and the metal layer 7d deposited on the conductive nitride layer 7c. As described above, the conductive nitride has a relatively high conductivity, a melting point higher than that of noble metal such as gold, an excellent diffusion barrier performance, and an oxidation resistance superior to that of metal such as tungsten or aluminum. In addition, the conductive nitride layer 7c has an excellent adhesiveness to the metal layer 7d. Thus, as compared to an electron source having a surface electrode composed of a metal thin-film, the electron source 10 according to the third embodiment can provide enhanced thermal resistance of the surface electrode 7 while suppressing the deterioration of electron emission characteristics. That is, the electron source 10 according to the third embodiment can suppress undesirable agglomeration otherwise caused in the material of the surface electrode 7 to prevent the deterioration of electron emission characteristics due to a thermal process such as the vacuum-sealing process. Further, the surface electrode 7 composed of the conductive nitride layer 7c and the metal layer 7d can prevent respective atoms constituting the surface electrode 7 and the electron transit layer 6 from being diffused therebetween. Thus, the materials of the surface electrode 7 and the electron transit layer 6 can be selected from various alternatives. The surface electrode 7 may be formed of only the conductive nitride layer.

While the third embodiment employs the glass substrate as the substrate 1, the glass substrate may be substituted with any other suitable substrate in the same manner as that in the second embodiment. The electron source 10 according to the third embodiment may also be used as an electron source for display devices in the same manner as that in the second embodiment.

With reference to FIGS. 8A to 8D a manufacturing process of the electron source 10 according to the third embodiment will be described below.

Figure 8A:
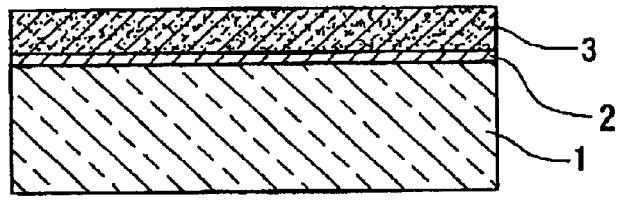
FIGS. 8A to 8D are sectional views of in-process and final products provided in major steps of a manufacturing process of the electron source according to the third embodiment of the present invention.

A lower electrode 2 composed of a metal film (e.g. molybdenum film) having a given film thickness (e.g. about 300 nm) is first formed on one of the principal surfaces of a substrate 1 composed of a silica glass substrate. Then, a non-doped polycrystalline silicon layer 3 having a given film thickness (e.g. 1.5 µm) is formed on the lower electrode 2 to provide the structure as shown in FIG. 8A. The procedure for forming the lower electrode 2 and the procedure for forming the non-doped polycrystalline silicon layer 3 are as same as those of the second embodiment.

Figure 8B:
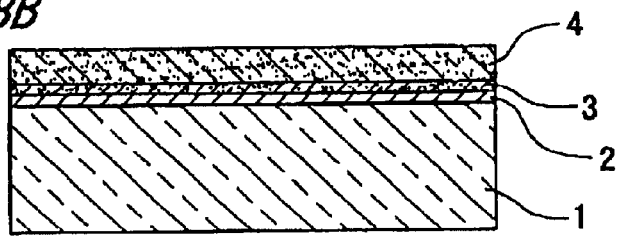

After the non-doped polycrystalline silicon layer 3 has been formed, an anodizing process is performed to form a porous polycrystalline silicon layer 4 in which polycrystalline silicon grains 51 (see FIG. 3), silicon nanocrystals 63 (see FIG. 3) and amorphous silicons are mixed together. Through this step, the structure as shown in FIG. 8B is obtained. The procedure for performing the anodizing process is as same as that of the first embodiment.

Figure 8C:
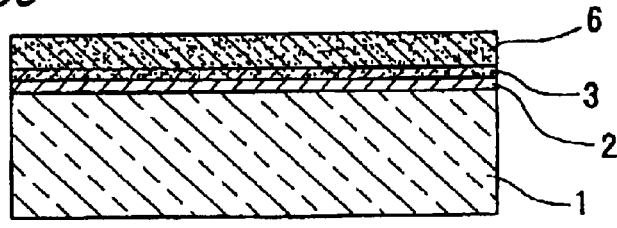

After the completion of the anodizing process, an oxidation process is performed to form an electron transit layer 6 composed of the composite nanocrystal layer having the structure as shown in FIG. 3. Through this step, the structure as shown in FIG. 8C is obtained. In the oxidation process, the composite nanocrystal layer 4 is oxidized, for example, through a rapid heating method to form the electron transit layer 6 (see FIG. 3) including the grains 51, the silicon nanocrystals 63, and the silicon oxide films 52, 64. The procedure for performing the oxidation process is as same as that of the first embodiment.

Figure 8D:
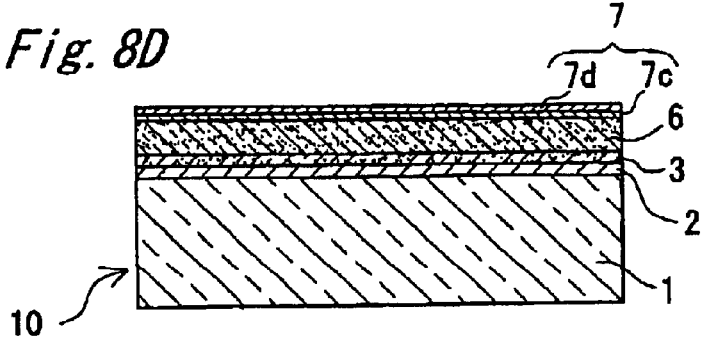

After the electron transit layer 6 has been formed, a conductive nitride layer 7c having a given film thickness (e.g. 1 nm) and a metal layer 7d having a given film thickness (e.g. 3 nm) are sequentially formed on the electron transit layer 6, for example, through a sputtering method. Through this step, a surface electrode 7 composed of the conductive nitride layer 7c and the metal layer 7d is formed, and the electron source 10 having the structure as shown in FIG. 8D is obtained.

The manufacturing process of the electron source 10 according to the third embodiment can provide the electron source 10 having enhanced thermal resistance with suppressing the deterioration of electron emission characteristics.

In the third embodiment, the conductive nitride layer 7c of the surface electrode 7 is formed through a sputtering method. A usable sputtering method may be selected from various types such as an RF sputtering method, RF magnetron sputtering method, DC sputtering method and DC magnetron sputtering method. The conductive nitride layer 7c is formed through a sputtering method using a target consisting of conductive nitride. This method can provide the conductive nitride layer 7c having a low surface roughness with excellent reproducibility and stability as well as a high throughput, which achieves a reduced manufacturing cost and an increased electron emitting area of the electron source 10. In addition, an existing sputtering apparatus can be readily diverted to an apparatus for forming the conductive nitride layer 7c, which provides a downsized equipment investment and a reduced equipment cost. Thus, the electron source 10 having enhanced thermal resistance with suppressing the deterioration of electron emission characteristics can be provided at a lower cost. Further, the conductive nitride 7c layer can be formed at a relatively low process temperature.

The method for forming the conductive nitride layer 7c is not limited to the aforementioned sputtering methods. For example, the conductive nitride layer may be formed through a vacuum evaporation method using a deposition source consisting of conductive nitride, or a reactive sputtering method using a target consisting of metal (pure metal) and gas (reactive gas) including nitrogen. The vacuum evaporation method or the reactive sputtering method can also provide the conductive nitride layer 7c having a low surface roughness with excellent reproducibility and stability as well as a high throughput, which achieves a reduced manufacturing cost and an increased electron emitting area of the electron source 10. Thus, the electron source 10 having enhanced thermal resistance with suppressing the deterioration of electron emission characteristics can be provided at a lower cost. Further, the conductive nitride layer can be formed at a relatively low process temperature. In addition, when the conductive nitride layer 7c is formed through the vacuum evaporation method, an existing vacuum evaporation apparatus can be readily diverted to an apparatus for forming the conductive nitride layer 7c, which provides a downsized equipment investment and a reduced equipment cost.

The reactive sputtering method using a target consisting of metal (pure metal) and gas (reactive gas) including nitrogen can facilitate the control of nitrogen concentration in the conductive nitride layer 7c. That is, in the reactive sputtering method, a type of the reaction gas and a mixing ratio of inert gas such as Ar to the is reactive gas including nitrogen atoms can be selected to control the composition of nitrogen in the conductive nitride layer 7c. Thus, the reactive sputtering method can provide the conductive nitride layer 7c having a nitrogen composition controlled at a desired value.

Generally, as compared to the nitride target, the pure metal target having a higher purity is widely placed on the market. Thus, the reactive sputtering method can provide the conductive nitride layer 7c including a less amount of metal impurities as compared to the sputtering method using conductive nitride as a target, and thereby performance decrement due to impurities can be suppressed.

Alternatively, the conductive nitride layer 7c may be formed through a CVD method. The CVD method can also provide the conductive nitride layer 7c having a low surface roughness with excellent reproducibility and stability as well as a high throughput, which achieves a reduced manufacturing cost and an increased electron emitting area of the electron source 10. Thus, the electron source 10 having enhanced thermal resistance with suppressing the deterioration of electron emission characteristics can be provided at a lower cost. Further, the CVD method is excellent in a step-coverage performance. Since a thermal CVD method typically involves a process temperature of 600° C. or more, it is preferable to use the plasma CVD method capable of lowering the process temperature.

In the step of forming the conductive nitride layer 7c, the conductive nitride layer 7c may be formed by depositing a metal film (e.g. titanium film) on the electron transit layer 6 through a vacuum evaporation method or a sputtering method and then implanting nitrogen ions into the metal film. This method can also form the conductive nitride layer 7c having a low surface roughness with excellent reproducibility and stability. In addition, this method can reduce the roughness of the interface between the conductive nitride layer 7c and the metal layer 7b, which achieves a reduced manufacturing cost and an increased electron emitting area of the electron source 10. Thus, the electron source 10 having enhanced thermal resistance with suppressing the deterioration of electron emission characteristics can be provided at a lower cost. Further, this method can form the conductive nitride layer 7c at a relatively low process temperature, and facilitate the control of conductivity in the conductive nitride layer 7c.

Alternatively, in the step of forming the conductive nitride layer 7c, the conductive nitride layer 7c may be formed by depositing a metal film (e.g. titanium film) on the electron transit layer 6 through a vacuum evaporation method or a sputtering method and then subjecting the metal film to a heat treatment under gas atmosphere including nitrogen. This method can also form the conductive nitride layer 7c having a low surface roughness with excellent reproducibility and stability. In addition, this method can reduce the roughness of the interface between the conductive nitride layer 7c and the metal layer 7b, which achieves a reduced manufacturing cost and an increased electron emitting area of the electron source 10. Thus, the electron source 10 having enhanced thermal resistance with suppressing the deterioration of electron emission characteristics can be provided at a lower cost.

In the third embodiment, also, the oxidation process may be substituted with a nitriding process or an oxynitriding process as same as the case of the first embodiment.

The lower electrode 2 may be formed to have a multilayer structure, and at least one of the layers may be formed as a conductive nitride layer. The conductive nitride has a relatively high conductivity, a melting point higher than that of noble metal such as gold, an excellent diffusion barrier performance, and an oxidation resistance superior to that of metal such as tungsten or aluminum. Thus, as compared to an electron source having a lower electrode 2 made of a metal, the lower electrode 2 having the conductive nitride layer can have enhanced thermal resistance with suppressing the deterioration of electron emission characteristics to prevent the deterioration of electron emission characteristics due to a thermal process such as the vacuum-sealing process. Further, since the lower electrode 2 is composed of the multilayer structure having at least one of conductive nitride layer, the conductive nitride layer can provide enhanced thermal resistance of the lower electrode 2. Further, another layer deposited on the conductive nitride layer can be arranged to provide reduced electric resistance of the lower electrode 2, and enhanced adhesiveness between the lower electrode 2 and a layer forming an interface together with the lower electrode 2. It is to be understood that the entire lower electrode 2 may be composed of a conductive nitride layer.

The conductive nitride layer used in the lower electrode 2 may be made of the same conductive nitride as the material used in the conductive nitride layer 7c of the surface electrode 7. Further, the conductive nitride layer of the lower electrode 2 may be formed through the same method as that for forming the conductive nitride layer 7c of the surface electrode 7.

(Fourth Embodiment)

A fourth embodiment of the present invention will be described below.

Figure 9:
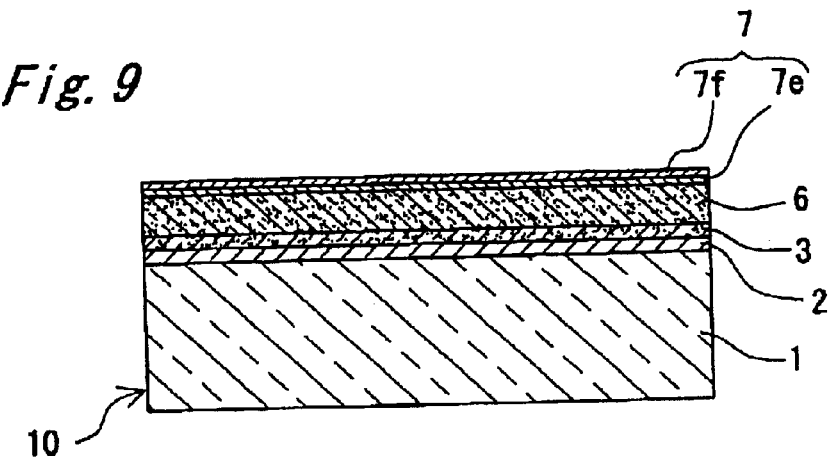
FIG. 9 is a sectional view of the electron source according to the fourth embodiment of the present invention.

As shown in FIG. 9, an electron source 10 according to the fourth embodiment comprises a substrate 1 composed of an insulative substrate (e.g. insulative glass substrate or insulative ceramic substrate), and a lower electrode 2 formed on one of the principal surfaces of the substrate 1. A semiconductor layer or a non-doped polycrystalline silicon layer 3 is formed on the lower electrode 2. An electron transit layer 6 (strong-field drift layer) composed of an oxidized porous polycrystalline silicon layer is formed on the polycrystalline silicon layer 3. Further, a surface electrode 7 is formed on the electron transit layer 6. Specifically, in the electron source 10, the surface electrode 7 and the lower electrode 2 are disposed opposed to one another, and the electron transit layer 6 is interposed between the surface and lower electrodes. The thickness of the surface electrode 7 is set at 12 nm or less. While the fourth embodiment employs the insulative substrate as the substrate 1, any other suitable semiconductor substrate such as a silicon substrate may be used as the substrate 1. Further, while the polycrystalline silicon layer 3 is interposed between the electron transit layer 6 and the lower electrode 2, the electron transit layer 6 may be formed directly on the lower electrode 2 without interposing the polycrystalline silicon layer 3.

In the electron source 10 as a ballistic electron surface-emitting type electron source according to the fourth embodiment, steps of emitting electrons or an electron emission model is the same as that of the electron source 10 according to the first embodiment (see FIGS. 2 and 3). Thus, as with the electron source 10 according to the first embodiment, the electron source 10 according to the fourth embodiment exhibits enhanced electron emission characteristics having a low dependence on vacuum degree and free from the popping phenomenon, and thereby can emit electrons stably.

While the fourth embodiment employs the glass substrate as the substrate 1, the glass substrate may be substituted with any other suitable substrate in the same manner as that in the second embodiment. The electron source 10 according to the fourth embodiment may also be used as an electron source for display devices in the same manner as that in the second embodiment.

The lower electrode 2 is made of highly doped n-type polycrystalline silicon. However, the material of the lower electrode 2 is not limited to the n-type polycrystalline silicon, and the lower electrode 2 may be made of metal such as Cr, W, Ti, Al, Cu, Au, Pt or Mo; alloy containing such metal; or impurity-doped semiconductor other than polycrystalline silicon.

The surface electrode 7 is composed of a conductive carbide layer 7e deposited on the electron transit layer 6 and a noble metal layer 7f deposited on the conductive carbide layer 7e. The conductive carbide layer 7e is made of conductive carbide consisting of zirconium carbide. Generally, the conductive carbide has a relatively high conductivity, a relatively low work function, a melting point higher than that of noble metal such as gold, and an excellent diffusion barrier performance. In addition, the conductive carbide has an oxidation resistance superior to that of metal such as tungsten or aluminum. The conductive carbide having these properties usable in the conductive carbide layer 7e is not limited to zirconium carbide, and it may be chromium carbide, molybdenum carbide, tungsten carbide, vanadium carbide, niobium carbide, tantalum carbide, titanium carbide, or hafnium carbide. In view of thermal stability, work function and reproducibility, it is preferable to use either one of zirconium carbide, titanium carbide and hafnium carbide.

The noble metal layer 7f is made of platinum which is one of noble metals (That is, the noble metal layer 7f is composed of a layer-structured platinum layer). However, the noble metal to be used is not limited to platinum, and the noble metal layer 7f may be made of any other suitable noble metal such as gold or iridium. Further, a portion of the noble metal layer 7f may be composed of a layer-structured platinum layer, and the remaining portion may be made of different noble metal other than platinum.

In the surface electrode 7, the thickness of the conductive carbide layer 7e is preferably set at 4 nm or less, and the thickness of the noble metal layer 7f is preferably set at 8 nm or less. More preferably, the thickness of the conductive carbide layer 7e is set at 2 nm or less, and the thickness of the noble metal layer 7f is set at 4 nm or less to provide enhanced electron emitting efficiency.

In the electron source 10 according to the fourth embodiment, the surface electrode 7 is composed of the conductive carbide layer 7e made of conductive carbide and the noble metal layer 7f made of noble metal. As described above, the conductive carbide has a relatively high conductivity, a relatively low work function, a melting point higher than that of noble metal, an excellent diffusion barrier performance, and an oxidation resistance superior to that of metal such as tungsten or aluminum. In addition, the conductive carbide layer 7e has an excellent adhesiveness to the noble metal layer 7f. Thus, as compared to an electron source having a surface electrode composed of a metal thin-film, the electron source 10 according to the fourth embodiment can provide enhanced thermal resistance of the surface electrode 7 while suppressing the deterioration of electron emission characteristics. That is, the electron source 10 according to the fourth embodiment can suppress undesirable agglomeration otherwise caused in the material of the surface electrode 7 to prevent the deterioration of electron emission characteristics due to a thermal process such as the vacuum-sealing process.

Further, the surface electrode 7 composed of the conductive carbide layer 7e and the noble metal layer 7f can prevent respective atoms constituting the surface electrode 7 and the electron transit layer 6 from being diffused therebetween. Thus, the materials of the surface electrode 7 and the electron transit layer 6 can be selected from various alternatives.

With reference to FIGS. 10A to 10D, a manufacturing process of the electron source 10 according to the fourth embodiment will be described below.

Figure 10A:
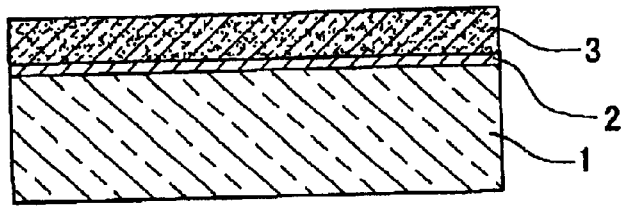
FIGS. 10A to 10D are sectional views of in-process and final products provided in major steps of a manufacturing process of the electron source according to the fourth embodiment of the present invention.

A non-doped polycrystalline silicon layer having a given film thickness (e.g. 1 $\mu$m) is first formed on one of the principal surfaces of the substrate 1, and an n-type impurity is doped into the polycrystalline silicon layer through an ion-implantation method or heat treatment to form a lower electrode 2 composed of a conductive polycrystalline silicon layer (n-type polycrystalline silicon layer). Then, an additional non-doped polycrystalline silicon layer 3 having a given film thickness (e.g. 1.5 $\mu$m) is formed on the side of the selected principal surface of the substrate 1 (on the lower electrode 2) to provide the structure as shown in FIG. 10A. The procedure for forming the non-doped polycrystalline silicon layer 3 is as same as that of the second embodiment. When the lower electrode 2 is made of metal such as Cr, W, Ti, Al, Cu, Au, Pt or Mo, or alloy containing such meta, the lower electrode 2 may be formed, for example, through a sputtering method or vacuum evaporation method.

Figure 10B:
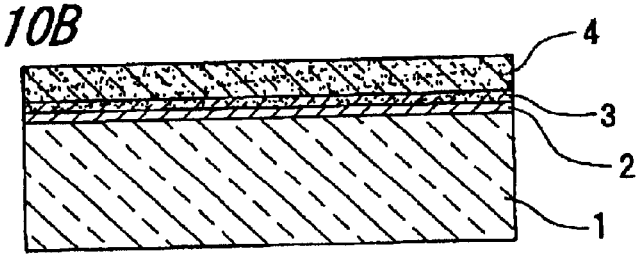

After the non-doped polycrystalline silicon layer 3 has been formed, a porous region is provided up to a given depth of the polycrystalline silicon layer 3 by means of an anodizing process. Through this step, a porous semiconductor layer or a porous polycrystalline silicon layer 4 is formed, and thus the structure as shown in FIG. 10B is obtained. The procedure for performing the anodizing process is as same as that of the first embodiment.

Figure 10C:
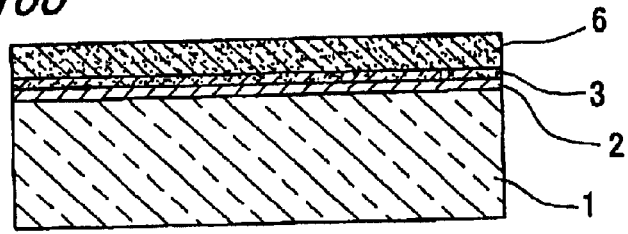

After the completion of the anodizing process, the porous polycrystalline silicon layer 4 is oxidized through an oxidation process. Through this step, an electron transit layer 6 composed of the oxidized porous polycrystalline silicon layer is formed, and thus the structure as shown in FIG. 10C is obtained. In the oxidation process, the porous polycrystalline silicon layer 4 is oxidized, for example, through a rapid heating method to form the electron transit layer 6 including the grains 51, the silicon nanocrystals 63, and the silicon oxide films 52, 64 (see FIG. 3). The procedure for performing the oxidation process is as same as that of the first embodiment.

Figure 10D:
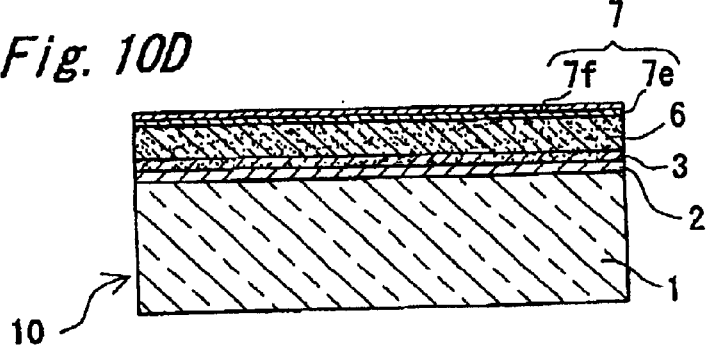

After the electron transit layer 6 has been formed, a conductive carbide layer 7e and a noble metal layer 7f are sequentially formed, for example, through a sputtering method. Through this step, a surface electrode 7 composed of the conductive carbide layer 7e and the noble metal layer 7f is formed on the electron transit layer 6, and thus the electron source 10 having the structure as shown in FIG. 10D is obtained.

The manufacturing process of the electron source 10 according to the fourth embodiment can provide the electron source 10 having enhanced thermal resistance with suppressing the deterioration of electron emission characteristics.

In the fourth embodiment, the conductive carbide layer 7e of the surface electrode 7 is formed through a sputtering method. A usable sputtering method may be selected from various types such as an RF sputtering method, RF magnetron sputtering method, DC sputtering method and DC magnetron sputtering method. In this case, the conductive carbide layer 7e is formed through a sputtering method using a target consisting of conductive carbide. These methods can provide the conductive carbide layer 7e having a low surface roughness with excellent reproducibility and stability as well as a high throughput, which achieves a reduced manufacturing cost and an increased electron emitting area of the electron source 10. In addition, an existing sputtering apparatus can be readily diverted to an apparatus for forming the conductive carbide layer 7e, which provides a downsized equipment investment and a reduced cost. Thus, the electron source 10 having enhanced thermal resistance with suppressing the deterioration of electron emission characteristics can be provided at a lower cost. Further, the conductive carbide layer 7e can be formed at a relatively low process temperature.

The film forming method for the conductive carbide layer 7e is not limited to the aforementioned sputtering methods. For example, the conductive carbide layer 7e may be formed through a vacuum evaporation method using a deposition source consisting of conductive carbide, or a reactive sputtering method using a target consisting of metal (pure metal) and gas (reactive gas) including carbon. The vacuum evaporation method or the reactive sputtering method can also provide the conductive carbide layer 7e having a low surface roughness with excellent reproducibility and stability as well as a high throughput, which achieves a reduced manufacturing cost and an increased electron emitting area of the electron source 10. Thus, the electron source 10 having enhanced thermal resistance with suppressing the deterioration of electron emission characteristics can be provided at a lower cost. Further, the conductive carbide layer 7e can be formed at a relatively low process temperature. In addition, when the conductive carbide layer 7e is formed through the vacuum evaporation method, an existing vacuum evaporation apparatus can be readily diverted to an apparatus for forming the conductive carbide layer 7e, which provides a downsized equipment investment and a reduced equipment cost.

An EB (Electron Beam) vacuum evaporation method is one of appropriate vacuum evaporation methods to be used, because conductive carbide has a high melting point. On the other hand, the reactive sputtering method using a target consisting of metal (pure metal) and gas (reactive gas) including carbon can facilitate the control of carbon concentration in the conductive carbide layer 7e. That is, in the reactive sputtering method, a type of the reactive gas or a mixing ratio of inert gas such as Ar to the reactive gas including carbon atoms can be appropriately selected to control a carbon concentration in the conductive carbide layer 7e so as to provide the conductive carbide layer 7e having a desired carbon concentration. Further, when using the reactive sputtering method, a desired film of titanium carbide, zirconium carbide or hafnium carbide can be formed at a relatively low substrate temperature of 150 to 500° C.

Generally, as compared to the carbide target, the pure metal target having a higher purity is widely placed on the market. Thus, the reactive sputtering method can provide the conductive carbide layer 7e including a less amount of metal impurities as compared to the sputtering method using conductive carbide as a target, and thereby performance decrement due to impurities can be suppressed. In view of film-thickness uniformity and coverage performance of the surface of a conductive carbide layer 7e having a thickness of 4 nm or less as in the fourth embodiment, the sputtering method, vacuum evaporation method or reactive sputtering method is more advantageous than other film forming methods to form such a conductive carbide layer.

In the fourth embodiment, the electron transit layer 6 is composed of the oxidized porous polycrystalline silicon layer. Alternatively, the electron transit layer 6 may be composed of a nitrided porous polycrystalline silicon layer or an oxynitrided porous polycrystalline silicon layer. Further, the electron transit layer 6 may be composed of any other suitable oxidized, nitrided or oxynitrided porous semiconductor layer. The oxidation, nitriding or oxynitriding method and the characteristics or advantages in these cases are as described in the first embodiment.

EXAMPLE

Figure 11:
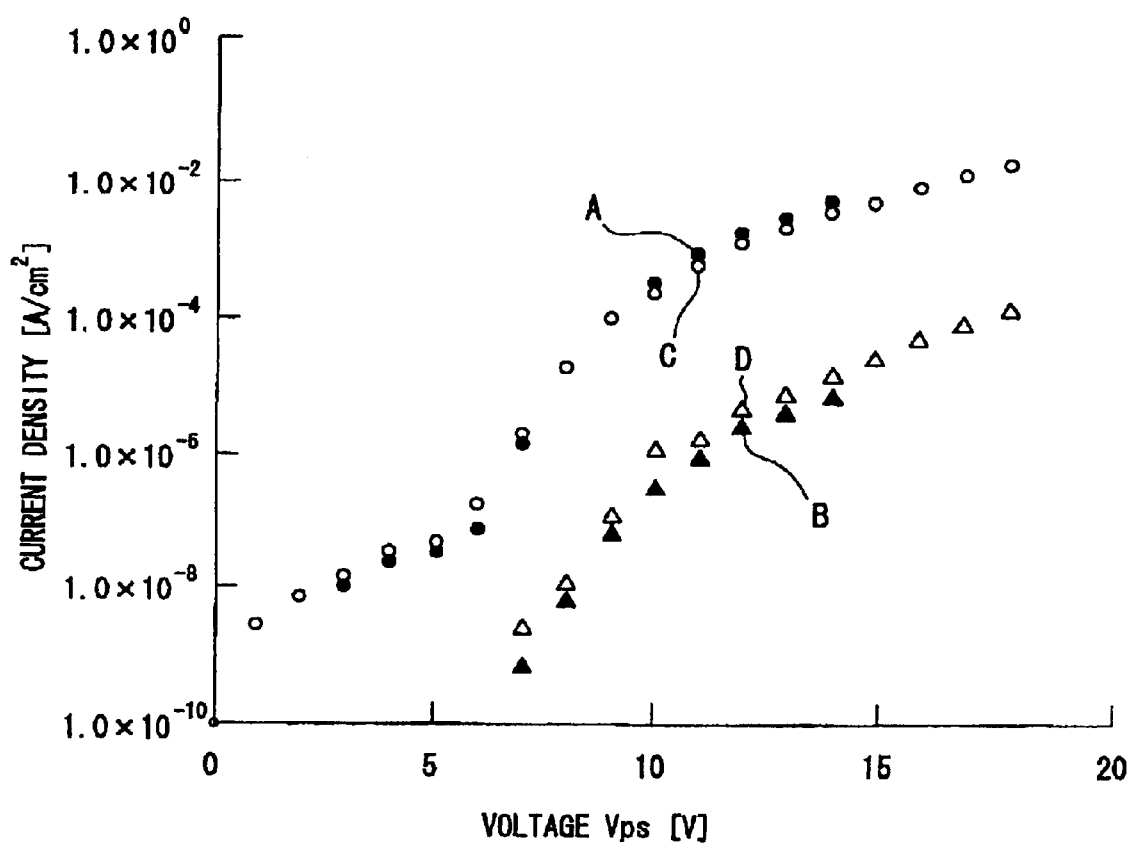
FIG. 11 is a graph showing the relationship between current density and voltage Vps before and after a heat treatment in the electron source according to the fourth embodiment.

With reference to FIG. 11, a measurement result of electron emission characteristics in both states before and after an actually produced electron source 10 through the manufacturing process according to the fourth embodiment was subjected to a heat treatment will be described below.

In this example, a silicon substrate was used as the substrate 1, an n-type polycrystalline silicon layer being used as the lower electrode 2, an oxidized porous polycrystalline silicon layer being used as the electron transit layer 6 (strong field drift layer), a zirconium carbide layer being used as the conductive carbide layer 7e of the surface electrode 7, and a platinum layer being used as the noble metal layer 7f of the surface electrode 7. The thickness of the conductive carbide layer 7e was 2 nm, and the thickness of the noble metal layer 7f was 4 nm. The conductive carbide layer 7e was formed through an RF magnetron sputtering method using a target consisting of zirconium carbide under Ar gas atmosphere.

Set out below were formation conditions of the conductive carbide layer 7e;

Pressure of Ar gas: 0.5–7 Pa

RF power density: 0.5–3.0 W/cm$^2$

Substrate temperature: 30–150° C.

in which the data shown in FIG. 11 was obtained from the electron source having the conductive carbide layer 7e of zirconium carbide formed under the following conditions.

Pressure of Ar gas: about 1.3 Pa

RF power density: about 1.7 W/cm$^2$

Substrate temperature: about 50° C.

Set out below were formation conditions of the noble metal layer 7f;

Pressure of Ar gas: about 0.7 Pa

RF power density: about 0.6 W/cm$^2$

Substrate temperature: about 50° C.

The electron source 10 was introduced into a vacuum chamber (not shown) to measure the electron emission characteristics of the electron source 10 in the state as shown in FIG. 2. That is, the collector 21 was positioned opposed to the surface electrode 7. Then, a DC voltage Vps was applied between the surface and lower electrodes such that the surface electrode 7 had a higher potential than that of the lower electrode 7, while another DC voltage Vc was applied between the collector and surface and electrodes such that the collector 21 had a higher potential than that of the surface electrode 7.

FIG. 11 shows the measurement result of electron emission characteristics in the state when vacuum degree in the vacuum chamber was set at $5 \times 10^{-5}$ Pa, and the DC voltage Vc was set at a constant value of 1000 V. In FIG. 11, the horizontal axis indicates the DC voltage Vps, and the vertical axis indicates the current density. The marks "A" indicate the current density of diode current Ips in the state before the heat treatment. The marks "B" indicate the current density of emission current Ie in the state before the heat treatment. The marks "C" indicate the current density of diode current Ips in the state after the heat treatment. The marks "D" indicate the current density of emission current Ie in the state after the heat treatment. The heat treatment was performed under $N_2$ gas atmosphere at 400° C. for 1 hour.

As can been seen from FIG. 11, in the electron source 10 of this example, neither emission current Ie nor emission emitting efficiency are degraded by the heat treatment. Further, in the electron source 10 of this example, whereas the diode current Ips is reduced by the heat treatment, the emission current Ie is increased. This proves that electron emitting efficiency is improved. While the invention has been described by reference to specific embodiments, various modifications and alterations will become apparent to those skilled in the art. Therefore, it is not intended that the invention be limited to the illustrative embodiments herein, but only by the appended claims and their equivalents.

What is claimed is:

1. A field emission-type electron source comprising:

a lower electrode;

an electron transit layer formed on said lower electrode and composed of a composite nanocrystal layer including polycrystalline silicon and a number of nanocrystalline silicons residing adjacent to a grain boundary of the polycrystalline silicon; and a surface electrode formed on said electron transit layer, in which the field emission-type electron source is adapted to allow an electron passing through said electron transit layer to be emitted through said surface electrode, wherein at least a portion of said surface electrode is made of layer-structured conductive carbide or layer-structured conductive nitride.

2. The field emission-type electron source according to claim 1, wherein said surface electrode includes a conductive carbide layer or conductive nitride layer deposited on said electron transit layer, and a noble metal layer deposited on the conductive carbide layer or conductive nitride layer.

3. The field emission-type electron source according to claim 2, wherein at least a portion of the noble metal layer is composed of a layer-structured platinum layer.

4. The field emission-type electron source according to claim 2, wherein the conductive carbide layer or conductive nitride layer of the surface electrode has a thickness of 4 nm or less, while the noble metal layer of the surface electrode has a thickness of 8 nm or less.

5. The field emission-type electron source according to claim 1, wherein the conductive carbide is titanium carbide, zirconium carbide or hafnium carbide, and the conductive nitride is tantalum nitride, titanium nitride, zirconium nitride or hafnium nitride.

6. A field emission-type electron source comprising:

a lower electrode;

a surface electrode; and an electron transit layer interposed between said lower electrode and said surface electrode to allow an electron to pass therethrough, wherein the field emission-type electron source is adapted to allow an electron passed through said electron transit layer to be emitted through said surface electrode, wherein said surface electrode is composed of a multilayer film including a conductive carbide layer or conductive nitride layer and a noble metal layer, said surface electrode having a surface formed with a number of concave portions allowing the multilayer film to have a locally reduced thickness.

7. A field emission-type electron source comprising:

a lower electrode;

an electron transit layer formed on said lower electrode and composed of a composite nanocrystal layer including polycrystalline silicon and a number of nanocrystalline silicons residing adjacent to a grain boundary of the polycrystalline silicon; and a surface electrode formed on said electron transit layer, wherein the field emission-type electron source is adapted to allow an electron passing through said electron transit layer to be emitted through said surface electrode, wherein at least a portion of said lower electrode is made of layer-structured conductive carbide or layer-structured conductive nitride.

8. The field emission-type electron source according to claim 7, wherein the conductive carbide is titanium carbide, zirconium carbide or hafnium carbide, and the conductive nitride is tantalum nitride, titanium nitride, zirconium nitride or hafnium nitride.

* * * * *